(12) United States Patent
Kwon et al.

(10) Patent No.: US 6,858,954 B2
(45) Date of Patent: Feb. 22, 2005

(54) RECIPROCATING MOTOR

(75) Inventors: Kye Si Kwon, Seoul (KR); Hyung Jin Kim, Seoul (KR); Hyuk Lee, Siheung (KR)

(73) Assignee: LG Electronics Inc., Seoul (KR)

( * ) Notice: Subject to any disclaimer, the term of this patent is extended or adjusted under 35 U.S.C. 154(b) by 135 days.

(21) Appl. No.: 09/988,751

(22) Filed: Nov. 20, 2001

(65) Prior Publication Data

US 2004/0012270 A1 Jan. 22, 2004

(30) Foreign Application Priority Data

Nov. 20, 2000 (KR) ........................................ 2000-68962

(51) Int. Cl.[7] .............................................. H02K 33/00
(52) U.S. Cl. ........................................ 310/15; 310/24
(58) Field of Search ............................ 310/12–15, 112, 310/22, 23, 24, 30, 33, 34

(56) References Cited

U.S. PATENT DOCUMENTS

| | | | | |
|---|---|---|---|---|
| 3,536,941 A | * | 10/1970 | Tourtellotte | 310/27 |
| 4,454,426 A | * | 6/1984 | Benson | 290/1 R |
| 4,675,563 A | * | 6/1987 | Goldowsky | 310/15 |
| 4,697,113 A | * | 9/1987 | Young | 310/15 |
| 5,208,498 A | * | 5/1993 | Hamajima | 310/12 |
| 5,717,260 A | * | 2/1998 | Cho | 310/12 |
| 5,982,053 A | * | 11/1999 | Chitayat | 310/12 |

FOREIGN PATENT DOCUMENTS

| | | | |
|---|---|---|---|
| CN | 88201010 U | 10/1988 | |
| CN | 1232926 A | 10/1999 | |
| JP | 03-107360 | 5/1991 | |
| JP | 2000-166189 | 6/2000 | |
| WO | WO 94/26020 | * 11/1994 | .......... H02K/41/03 |
| WO | 00/62406 | 10/2000 | |

* cited by examiner

*Primary Examiner*—Thanh Lam
*Assistant Examiner*—David W. Scheuermann
(74) *Attorney, Agent, or Firm*—Birch, Stewart, Kolasch & Birch, LLP

(57) ABSTRACT

Disclosed is a reciprocating motor including a multi type outer core having a plurality of single cores constructed with consecutively-stacked lamination sheets centering around a plurality of ring-shaped winding coils so as form a cylindrical structure and an insulating member placed between a plurality of the single cores, an inner core inserted in the multi type outer core so as to leave a predetermined gap with an inside circumferential face of the multi type outer core, and a moving part having a plurality of magnet rows confronting the winding coils of the multi type outer core respectively so as to reciprocate in accordance with a variation of currents flowing through the winding coils. The present invention generates simple fluxes formed in the flux paths and prevents the fluxes from being cancelled each other, thereby enabling to increase an efficiency of a motor by decreasing the magnetic saturation as well as provide a simple design of the motor. Moreover, the present invention enables to reduce the amount of magnets required for the motor, thereby saving a manufacturing cost.

11 Claims, 6 Drawing Sheets

—— FLUXES BY FIRST MAGNET(41)
------ FLUXES BY SECOND MAGNET(41')

—— FLUXES BY FIRST WINDING COIL(30)
------ FLUXES BY SECOND WINDING COIL(30')

RECIPROCATING MOTOR

BACKGROUND OF THE INVENTION

1. Field of the Invention

The present invention relates to a reciprocating motor, and more particularly, to a multi-windows type reciprocating motor having an outer core equipped with a pair of winding coils and a pair of magnets corresponding to the winding coils and arranged in two rows.

2. Background of the Related Art

FIG. 1 illustrates a side view of a reciprocating motor according to a related art and FIG. 2 illustrates a cross-sectional view of a reciprocating motor bisected along a line II—II in FIG. 1.

Referring to FIG. 1 and FIG. 2, a reciprocating motor according to a related art includes a fixed part S constructed with a multi type cylindrical outer core 10 and a cylindrical inner core 20 inserted into the outer core 10 leaving a predetermined gap, a pair of winding coils 30 and 30' coupled inside the multi type outer core 10 or inner core 20, and a moving part 40 having magnets 41 and 41' and inserted between the outer and inner cores 10 and 20 so as to reciprocate.

Besides, FIG. 1 and FIG. 2 illustrate exemplarily a structure that the winding coils 30 and 30' are coupled with the multi type outer core 10.

Major components of the reciprocating motor according to a related art are explained in the following.

The multi type outer core 10 is constructed with a plurality of lamination sheets 11 stacked as a radial shape so as to form a cylindrical feature. Each of the lamination sheets 11 is a thin plate having a predetermined shape.

The lamination sheet 11, as shown in FIG. 2, is constructed with a horizontal path part 11a having a predetermined width and length so as to form an outer circumferential face of the multi type outer core 10 and first to third vertical path parts 11b, 11c, and 11d extending from a middle part and both ends of the horizontal path part 11a in a direction of a center of the core so as to have predetermined width and length.

The first to third vertical path parts 11b, 11c, and 11d are formed to leave predetermined intervals therebetween so as to form poles at the tips. Hence, a pair of coil-fitting grooves H and H' are provided between the first to third vertical path parts 11b, 11c, and 11d.

The coil-fitting grooves H and H' are rectangular shapes of which one sides toward an inner circumferential face of the multi type outer core 10 are open.

The winding coils 30 and 30' provided by winding coils as a ring type are inserted into the coil-landing grooves H and H' of the multi type outer coil 10 so as to be mounted thereon.

Such a multi type outer core 10 is formed by leaving a predetermined interval between a pair of the winding coils 30 and 30' in parallel with each other and by stacking the lamination sheets 11 along a pair of the winding coils 30 and 30' cylindrically.

In this case, the lamination sheets 11 are stacked in a manner that the winding coils 30 and 30' are inserted into the coil-fitting grooves H and H'.

Meanwhile, a plurality of lamination sheets 21 comprising a plurality of thin plates having a predetermined size are stacked radially one another so as to construct the cylindrical inner core 20. In this case, each of the lamination sheets 21 has a rectangular shape having a length corresponding to the length of the multi type outer core 10.

Such an inner core 20 is inserted into an inside diameter of the multi type outer core 10 coupled with the winding coils 30 and 30' so as to have a predetermined gap from an inner circumferential face of the multi type outer core 10 in a radial direction.

The moving part 40, as shown in FIG. 1, includes a plurality of magnets 41 fixed to an outer circumferential face of a cylindrical magnet holder 42 in a circumferential direction. And, the magnets 41 and 41', as shown in FIG. 2, are arranged on the outer circumferential face of the magnet holder 42 so as to form a pair of rows in a circumferential direction.

Namely, the magnets 41 and 41' are constructed with two rows so as to confront a pair of the winding coils 30 and 30' inserted in the coil-fitting grooves H and H' of the multi type outer core 10.

A length L of each of the magnets 41 and 41' is determined by adding a width w2 of the pole of the multi type outer core 10, i.e. a width of one of the vertical path parts of the lamination sheet 11 constructing the multi type outer core 10, to a width w1 of the coil-fitting groove H or H'.

Therefore, in the moving part 40, the magnets 41 and 41' are arranged to confront the coil-fitting grooves H and H' of the multi type outer core 10 so that the magnet holder 42 enables to carry out a reciprocating motion straightly between the multi type outer core 10 and the inner core 20 in accordance with a current flow.

Operation of the above-constructed reciprocating motor according to a related art is explained by referring to FIG. 3 and FIG. 4 as follows.

FIG. 3 and FIG. 4 illustrate cross-sectional views for explaining operational states of a reciprocating motor according to a related art.

Referring to FIG. 3, when currents are simultaneously applied in different directions respectively to a pair of the winding coils 30 and 30' coupled with the multi type outer core 10, one flux is formed by the current flowing through the winding coil 30 in a clockwise direction (direction a) along the inner core 20 and multi type outer core 10 adjacent to the winding coil 30 located at a left side in the drawing.

Namely, generated is the closed-loop type flux having a path consisting of the first vertical path part 11b—horizontal path part 11a—second vertical path part 11c—inner core 20—first vertical path part 11b.

At this moment, the other flux is formed by the current flowing through the winding coil 30' in a counterclockwise direction (direction b) along the inner core 20 and multi type outer core 10 adjacent to the winding coil 30' located at a right side in the drawing.

Namely, generated is the other closed-loop type flux having a path consisting of the third vertical path part 11d—horizontal path part 11a—second vertical path part 11c—inner core 20 —third vertical path part 11d.

Therefore, the moving part 40 including the magnets 41 and 41' moves toward the right direction (direction A) of the drawing by a reciprocal reaction of a pair of the fluxes formed by the currents flowing through the winding coils 30 and 30' and the other pair of the fluxes formed between the multi type outer core 10 and inner core 20.

On the contrary, if the directions of the currents applied to a pair of the winding coils 30 and 30' are switched, as shown in FIG. 4, one flux is formed by the current flowing through the left winding coil 30 in a counterclockwise direction (direction b) along the inner core 20 and multi type outer core 10 adjacent to the left winding coil 30 as soon as the other flux is formed by the current flowing through the right winding coil 30' in a clockwise direction (direction a) along the inner core 20 and multi type outer core 10 adjacent to the right winding coil 30'.

Therefore, the moving part 40 including the magnets 41 and 41' moves toward the left direction (direction B) of the drawing by a reciprocal reaction of a pair of the fluxes formed by the currents flowing through the winding coils 30 and 30' and the other pair of the fluxes formed between the multi type outer core 10 and inner core 20.

Thus, the above-explained reciprocating motor enables the moving part 40 having the magnets 41 and 41' to carry out a reciprocating motion by alternating directions of the currents flowing through a pair of the winding coils 30 and 30' in different directions.

However, the above-explained reciprocating motor according to a related art results in the following problems.

FIG. 5 illustrates a diagram for a state of a magnetic flux generated by a pair of magnets 41 and 41' in a reciprocating motor according to a related art, in which the moving part 40 has moved most to the left side.

Referring to FIG. 5, fluxes are formed at the third vertical path part 11d in directions opposite to each other by a pair of the magnets 41 and 41', thereby failing to cancel the fluxes each other. Yet, magnetic saturation may occur at the first and second path parts 11b and 11c due to relatively large flows of the fluxes.

Namely, as each of the lamination sheets 11 constructing the multi type outer core 10 has a single sheet structure, the flux generated by the first magnet 41 flows to the third vertical path part 11d and the other flux by the second magnet 41' flows to the first vertical path part 11b. Hence, other path parts failing to be adjacent to the first and second magnets 41 and 41' are affected by such fluxes.

Thus, during the process of forming the fluxes in the lamination sheets, as shown in FIG. 5, the flux (of the third vertical path part) is cancelled but the other fluxes (of the first and second vertical path parts) are merged to generate the magnetic saturation.

Therefore, the above-explained reciprocating motor according to the related art has to design the parts of the respective path parts in the lamination sheets 11 constructing the multi type outer core 10 so as not to generate the magnetic saturation, thereby having difficulty in designing a motor.

FIG. 6 illustrates a diagram for the flux states generated by the current flows of a pair of the winding coils 30 and 30' in a reciprocating motor according to a related art, in which the fluxes generated from the winding coils are affected reciprocally due to the single-sheet-structured lamination sheets 11 constructing the multi type outer core 10 when the currents flows through a pair of the winding coils 30 and 30' respectively in directions opposite to each other.

Referring to FIG. 6, the fluxes generated by the respective winding coils 30 and 30' flow through the first and third vertical path parts 11b and 11d in opposite directions, thereby reducing the fluxes. As the polarities working reciprocally with the magnets 41 and 41' decrease, so does a motor constant which is an important factor affecting an efficiency of a motor.

Moreover, as shown in FIG. 2, sizes of the magnets 41 and 41', which are determined by the opening widths w1 of the coil-fitting grooves H and H' and the widths w2 of the poles, are so large that supply of the magnets demands sufficient amount. Thus, a manufacturing cost rises.

SUMMARY OF THE INVENTION

Accordingly, the present invention is directed to a reciprocating motor that substantially obviates one or more problems due to limitations and disadvantages of the related art.

An object of the present invention is to provide a reciprocating motor enabling to improve a performance and reduce a required amount of the expensive magnets by minimizing interference between fluxes generated from both magnets by installing an insulating member between both of the magnets.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a reciprocating motor according to the present invention includes a multi type outer core having a plurality of single cores constructed with consecutively-stacked lamination sheets centering around a plurality of ring-shaped winding coils so as form a cylindrical structure and an insulating member placed between a plurality of the single cores, an inner core inserted in the multi type outer core so as to leave a predetermined gap with an inside circumferential face of the multi type outer core, and a moving part having a plurality of magnet rows confronting the winding coils of the multi type outer core respectively so as to reciprocate in accordance with a variation of currents flowing through the winding coils.

Preferably, lateral sides of the single cores are fixed in one body to the insulating member centering around the insulating member.

Preferably, shapes and structures of the single cores are identical to each other.

Preferably, the single cores of the multi type outer core are constructed with the lamination sheets of 'L' type thin plates stacked each other alternately centering around the winding coils so as to form the cylindrical structure.

Preferably, each of the lamination sheets is constructed with a horizontal path part K1 forming an outer circumferential face of the single core, a vertical path part extending from one end of the horizontal path part in a direction vertical to the horizontal path part, and a slant path part inclined from an end of the vertical path part in a length direction of the horizontal path part.

Preferably, the respective lamination sheets are stacked alternately so that the vertical and slant path parts confront each other so as to construct the single cores and wherein opening parts are formed between the slant path parts respectively so as to open in a direction of the magnets.

Preferably, a length of each of the magnets is determined by a length attained by adding a width of the opening part to a width of the slant path part forming a pole.

Preferably, the insulating member is formed to have a predetermined thickness enough to completely isolate the first and second single cores from each other and having a ring shape corresponding to contact faces of the first and second cores.

Preferably, the first and second single cores are fixed in one body to the insulating member by a connecting-fixing means centering around the insulating member.

Preferably, the connecting-fixing means comprises connecting recesses formed at both sides of the single cores and fixing protrusions protruding from both sides of the insulating member so as to fix the first and second single cores thereto by being inserted into the connecting recesses by force.

Preferably, the connecting recesses and the fixing protrusions are round ring-shaped so as to be coupled with each other.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
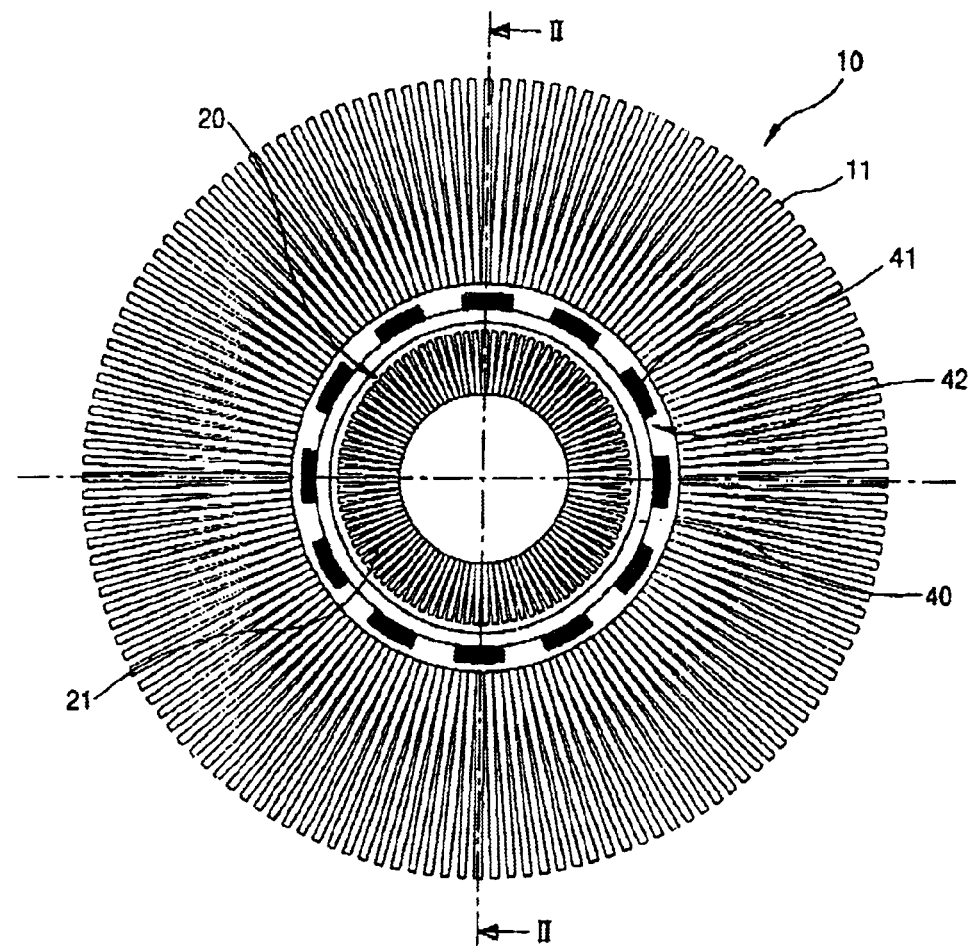
FIG. 1 illustrates a side view of a reciprocating motor according to a related art.
Figure 2:
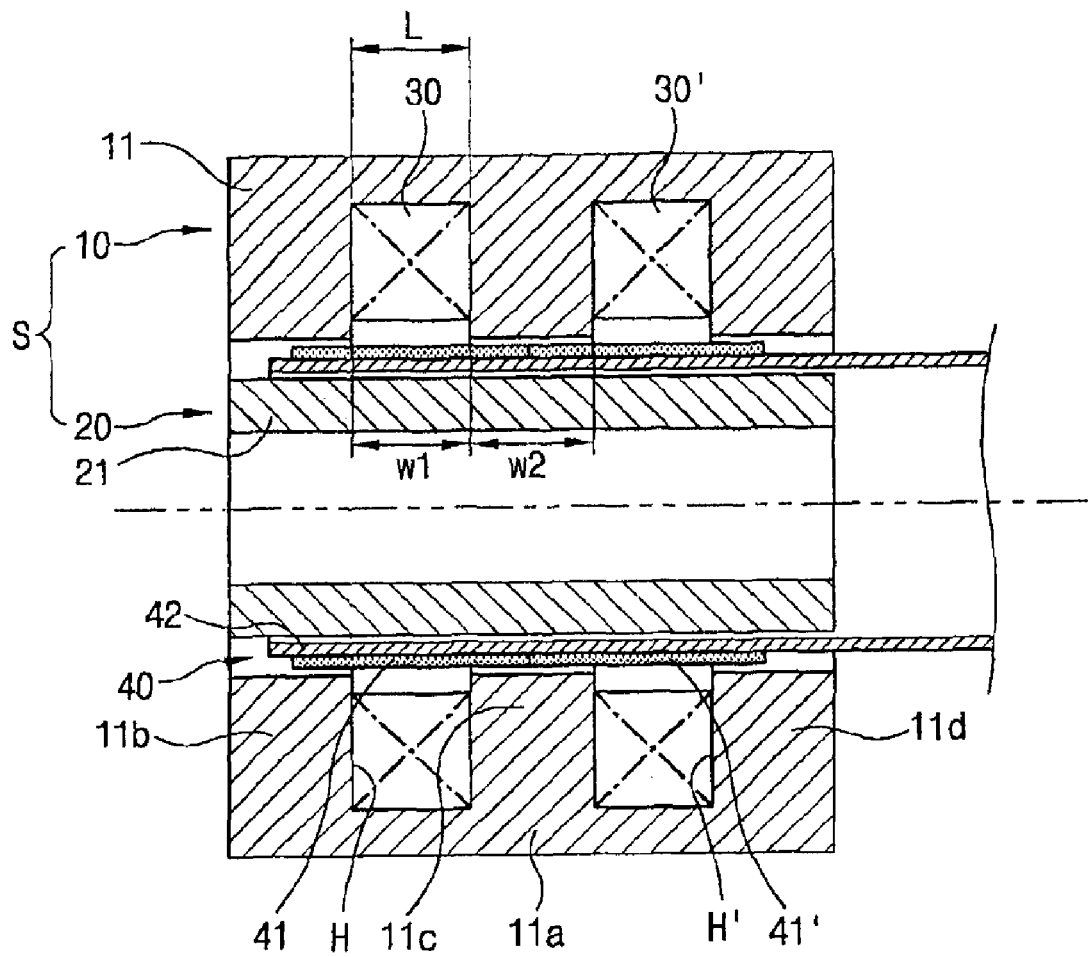
FIG. 2 illustrates a cross-sectional view of a reciprocating motor bisected along a line II—II in FIG. 1.
Figure 3:
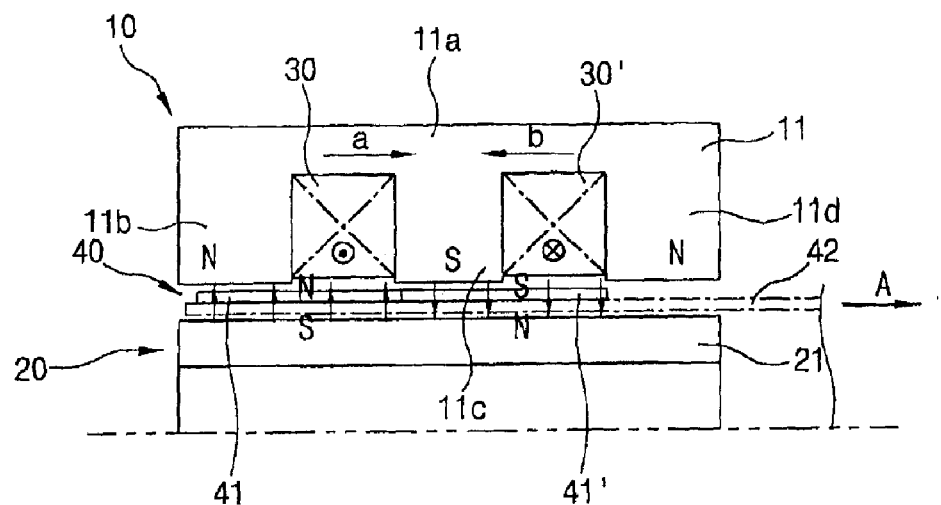
FIG. 3 and FIG. 4 illustrate cross-sectional views for explaining operational states of a reciprocating motor according to a related art.
Figure 4:
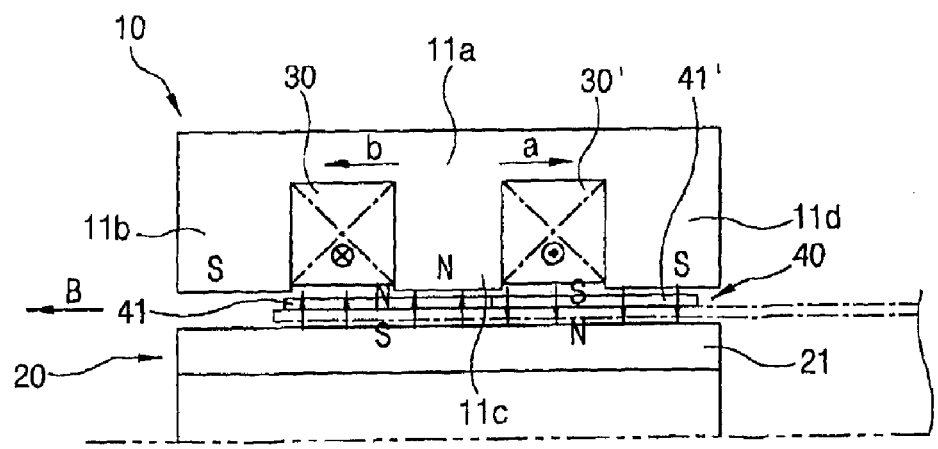
Figure 5:
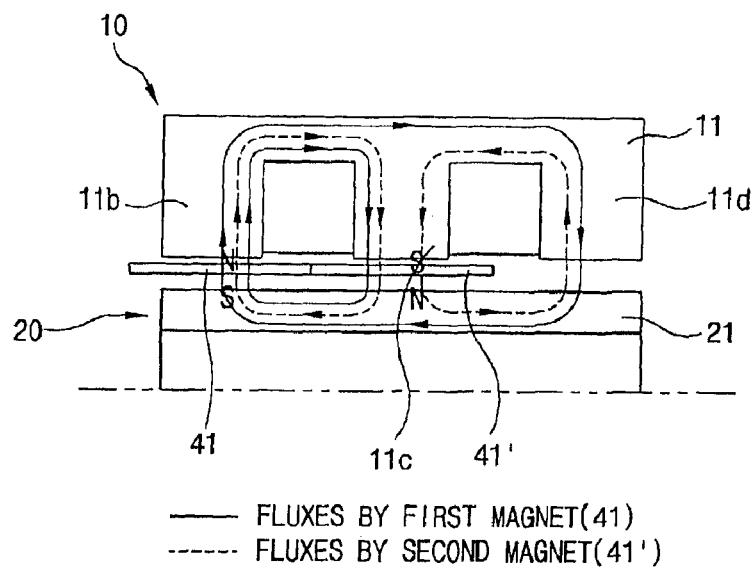
FIG. 5 illustrates a diagram for explaining magnetic flux generated by a pair of magnets in a reciprocating motor according to a related art.
Figure 6:
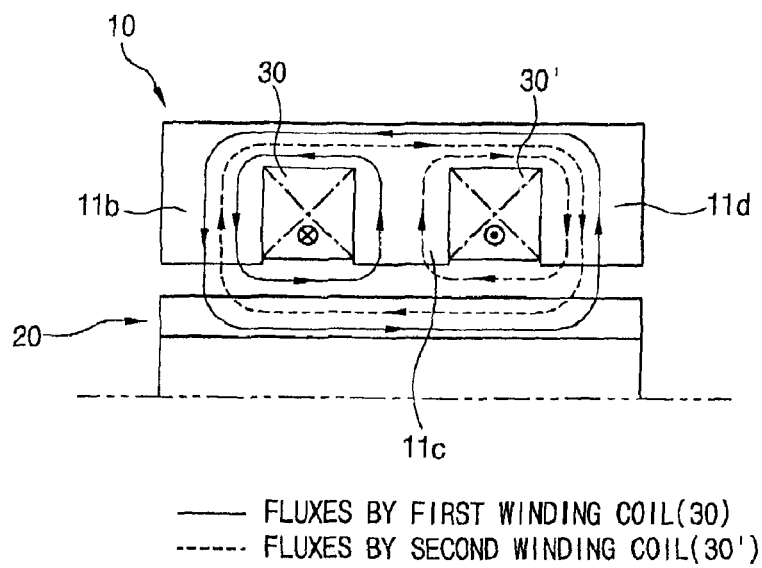
FIG. 6 illustrates a diagram for explaining flux generated by a current flow of a pair of winding coils in a reciprocating motor according to a related art.
Figure 7:
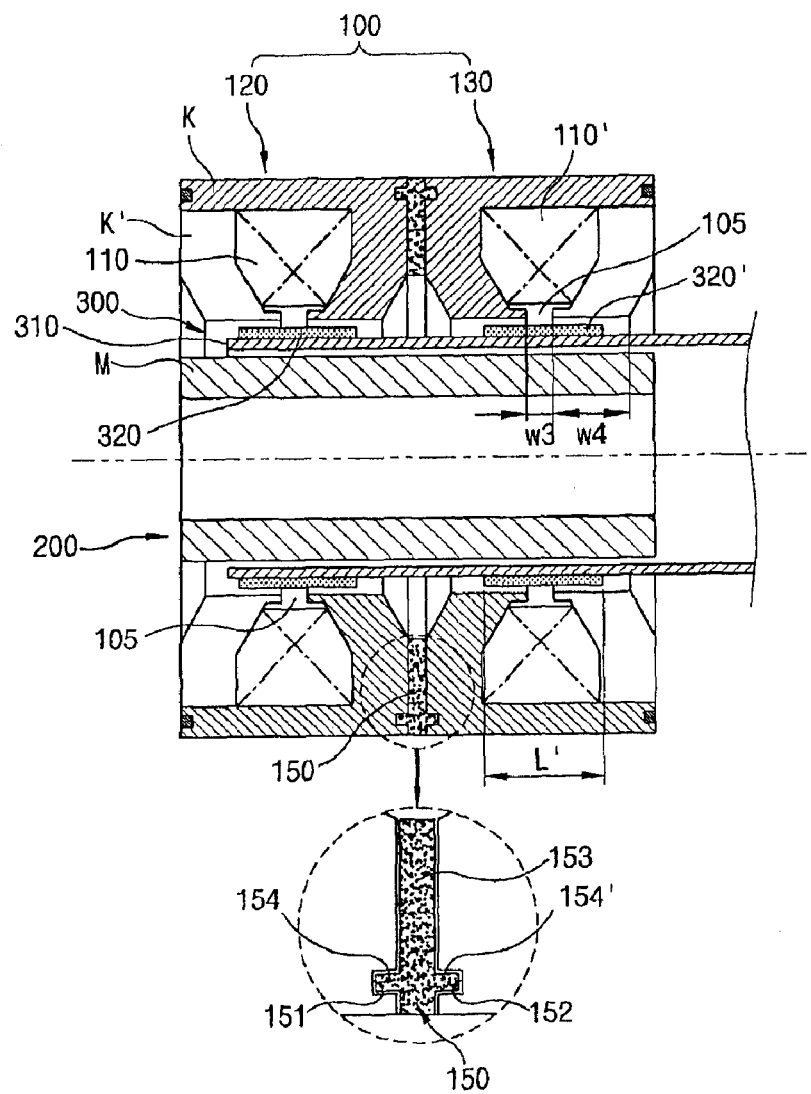
FIG. 7 illustrates a vertical cross-sectional view of a reciprocating motor and a magnified cross-sectional view of a major part thereof according to the present invention.

FIG. 7 illustrates a vertical cross-sectional view of a reciprocating motor and a magnified cross-sectional view of a major part thereof according to the present invention.

Referring to FIG. 7, a reciprocating motor according to the present invention includes a fixed part constructed with a multi type outer core 100 having a pair of winding coils 110 and 110' and an inner core 200 and a moving part 300 having magnets 320 and 320' and inserted between the outer and inner cores 100 and 200 so as to reciprocate in accordance with a variation of currents flowing through the winding coils 110 and 110'.

Explained in detail as follows are components of the above-constructed reciprocating motor according to the present invention.

The multi type outer core 100 includes a pair of single coils 120 and 130 constructing a cylindrical structure formed by stacking lamination sheets consecutively centering around a pair of the ring type winding coils 110 and 110' and an insulating member 153 placed between adjacent sides of a pair of the single cores 120 and 130.

The single cores 120 and 130 include a first single core 120 constructed with lamination sheets K and K' of 'L' type plates stacked alternately each other so as to form a cylindrical shape centering around the winding coils 110 and 110' and a second single core 130 having the same structure of the first single core 120 so as to be coupled in parallel with the first single core 120 through the insulating member 150.

A feature of the lamination sheet K constructing the first and second single cores 120 and 130 is explained by referring to FIG. 8 as follows.

Figure 8:
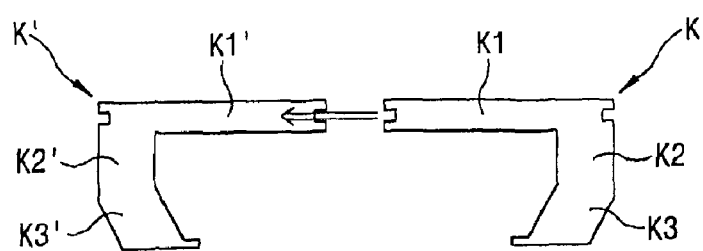
FIG. 8 illustrates an assembly of lamination sheets constructing a reciprocating motor according to the present invention.

The lamination sheet, as shown in FIG. 8, is constructed with a horizontal path part K1 having predetermined width and length so as to form an outer circumferential face of the single core, a vertical path part K2 extending from one end of the horizontal path part K1 in a direction vertical to the horizontal path part K1, and a slant path part K3 inclined from an end of the vertical path part K2 in a length direction of the horizontal path part K1.

A plurality of lamination sheets K and K', of which vertical and slant path parts K2/K2' and K3/K3' confront each other, are stacked alternately at both sides of the winding coils 110 and 110' so as to construct the single cores 120 and 130.

In the first and second single cores 120 and 130, poles are generated from tips of the slant path parts K3 of the stacked lamination sheets K and K' and a width w3 of an opening part 105, as shown in FIG. 7, is formed between the slant path parts K3 and K3'.

Meanwhile, ring type connecting recesses 151 and 152 having predetermined width and depth, as shown in FIG. 7, are formed at adjacent sides of the first and second single cores 120 and 130. The insulating member 150 is inserted into the connecting recesses 151 and 152 so as to make the first and second single cores 120 and 130 fixed thereto.

The insulating member 150 consists of an insulating portion 153 having a predetermined thickness enough to absolutely isolate the first and second single cores from each other and having a ring shape corresponding to contact faces of the first and second cores 120 and 130 and a pair of ring-shaped fixing protrusions 154 and 154' protruding from both sides of the insulating portion 153 so as to fix the first and second single cores 120 and 130 thereto by being inserted into the connecting recesses 151 and 152.

Such an insulating member 150 is preferably formed of a non-magnetic material such as aluminum, stainless steel or the like so as to insulate fluxes generated from the first and second single cores 120 and 130.

Thus, both of the fixing protrusions 154 and 154' of the insulating member 150 are inserted into the connecting recess 151 of the first single core 120 and the connecting recess 152 of the second single core 130 by force, respectively, so as to assemble the first and second single cores in parallel with each other.

Then, the inner core 200 is inserted in the multi type outer core 100 so as to have a predetermined gap from an inner circumferential face of the multi type outer core 100.

Namely, a plurality of lamination sheets M comprising a plurality of rectangular thin plates, each having a predetermined width and a length corresponding to a length of the multi type outer core 100, are stacked radially one another so as to construct the cylindrical inner core 200 having an outside diameter enabling to be inserted inside the multi type outer core 100. Such an inner core 200 is inserted into an inside diameter of the multi type outer core 100 so as to have a predetermined gap from an inner circumferential face of the multi type outer core 100.

The moving part 300 includes a cylindrical magnet holder 310 placed between the multi type outer core 100 and the inner core 200 and a plurality of magnets 320 and 320' fixed to an outer circumferential face of the cylindrical magnet holder 310 in a circumferential direction so as to confront the winding coil 110 of the first single core 120 and the winding coil 110' of the second single core 130 respectively. In this case, the magnets 320 and 320' are arranged to be coupled each other on the outer circumferential face of the magnet holder 310 so as to form a pair of rows in a circumferential direction.

Namely, the moving part 300 includes a first magnet row consisting of a plurality of the magnets 320 confronting the winding coil 110 of the first single coil 120 on the outer circumferential face of the magnet holder 310 and a second magnet row on the outer circumferential face of the magnet holder 310 so as to confront the winding coil 110' of the second single core 130 and leave a predetermined interval with the first magnet row.

A length L' of each of the magnets 320 and 320' is determined by a distance between the poles of the single cores 120 and 130, i.e. a length attained by adding a width w3 of the opening part 105 to a width w4 of one of the poles.

Such a moving part 300 is inserted between the multi type outer core 100 and the inner core 200 so that the first and second magnet rows 320 and 320' confront the winding coils 110 and 110' of the first and second single cores 120 and 130, respectively.

Operational effect of the above-constructed reciprocating motor according to the present invention is explained by referring to FIG. 9 and FIG. 10 as follows.

Figure 9:
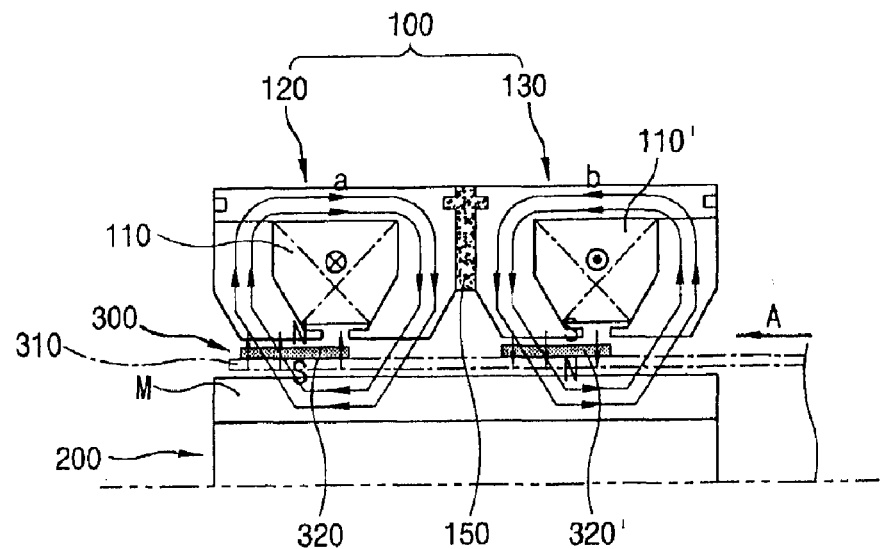
FIG. 9 and FIG. 10 illustrate cross-sectional views for explaining operational states of a reciprocating motor according to the present invention.
Figure 10:
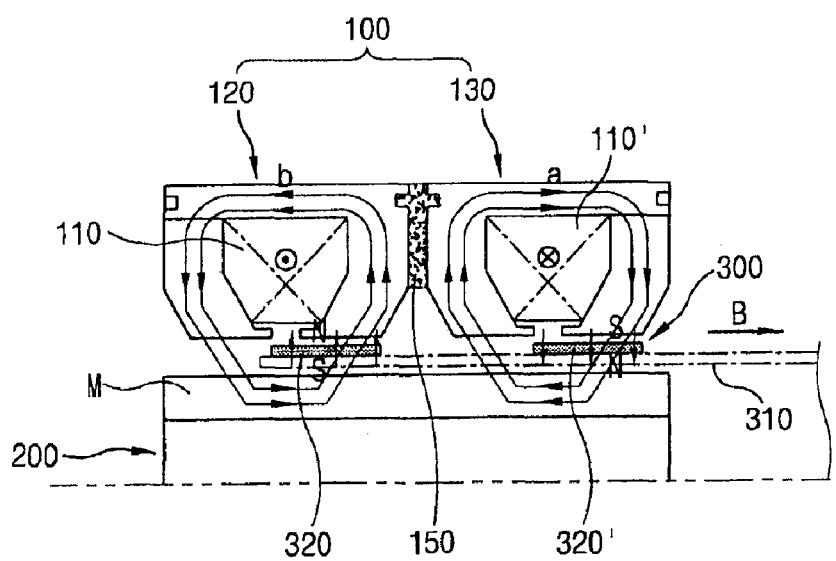

FIG. 8 illustrates an assembly of lamination sheets constructing a reciprocating motor according to the present invention, and FIG. 9 and FIG. 10 illustrate cross-sectional views for explaining operational states of a reciprocating motor according to the present invention.

When currents are simultaneously applied in different directions respectively to a pair of the winding coils 110 and 110' coupled with the multi type outer core 100, as shown in FIG. 9, one flux is formed by the current flowing through the winding coil 110 in a clockwise direction (direction a) along the inner core 200 and the first single core 120 adjacent to the winding coil 110.

Yet, the other flux is generated by the current flowing through the other winding coil 110' in a counterclockwise direction (direction b) along the second single core 130 and the inner core 200 adjacent to the winding coil 110'.

In this case, the fluxes generated by the currents flowing through the winding coils 110 and 110' are formed in the first and second single cores 120 and 130, respectively, so as to be isolated from each other by the insulating member 150. Therefore, no interference between the two fluxes occurs.

Accordingly, the moving part 300 moves toward the left direction (direction A) of the drawing by a reciprocal reaction of a pair of the fluxes formed by the currents flowing through the winding coils 110 and 110' and the other pair of fluxes generated from the magnets 320 and 320' constructing the first and second magnet rows.

On the contrary, if the directions of the currents simultaneously applied to a pair of the winding coils 110 and 110' are reversed, as shown in FIG. 10, one flux is formed by the current flowing through the winding coil 110 in a counterclockwise direction (direction b) along the inner core 200 and the first single core 120 adjacent to the winding coil 110.

Yet, the other flux is generated by the current flowing through the other winding coil 110' in a clockwise direction (direction a) along the second single core 130 and the inner core 200 adjacent to the winding coil 110'.

Similarly, the fluxes generated by the currents flowing through the winding coils 110 and 110' are formed in the first and second single cores 120 and 130, respectively, so as to be isolated from each other by the insulating member 150. Therefore, no interference between the two fluxes occurs.

Accordingly, the moving part 300 moves toward the right direction (direction B) by a reciprocal reaction of a pair of the fluxes formed by the currents flowing through the winding coils 110 and 110' and the other pair of fluxes generated from the magnets 320 and 320' constructing the first and second magnet rows.

Thus, the above-explained reciprocating motor enables the moving part 300 to carry out a reciprocating motion continuously by alternating directions of the currents flowing through a pair of the winding coils 110 and 110' in different directions.

In the present invention, the fluxes generated from the currents flowing through the winding coils 110 and 110' coupled with the multi type outer core 100 are isolated from the other fluxes generated from the magnets 320 and 320' confronting the winding coils 110 and 110' respectively by the insulating member 150. Hence, the fluxes are formed only in the first and second single coils 120 and 130 respectively so as to be from interference between the fluxes in directions opposite to each other. Therefore, the present invention enables to prevent the fluxes from being cancelled each other.

Moreover, the first and second single cores 120 and 130 of the multi type outer core 100 are constructed with a plurality of lamination sheets K and K' stacked each other alternately, thereby enabling to reduce the width w3 of the opening part 105 determining the length of the magnet 320. Therefore, the present invention enables to reduce the amount of magnets required for manufacturing the motor.

Accordingly, the present invention generates simple fluxes formed in the flux paths and prevents the fluxes from being cancelled each other, thereby enabling to increase an efficiency of a motor by decreasing the magnetic saturation as well as provide a simple design of the motor.

Moreover, the present invention enables to reduce the amount of magnets required for the motor, thereby saving a manufacturing cost.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A reciprocating motor comprising:

an outer core having a plurality of single cores constructed with consecutively-stacked lamination sheets centering around a plurality of ring-shaped winding coils so as form a cylindrical structure and a magnetically insulating member placed between the single cores so that fluxes formed in the plurality of single cores by currents flowing through the winning coils are isolated from each other by the insulating member;

an inner core inserted in the outer core so as to leave a predetermined gap with an inside circumferential face of the outer core; and a moving part having a plurality of magnet rows confronting the winding coils of the outer core respectively so as to reciprocate in accordance with a variation of currents flowing through the winding coils.

2. The reciprocating motor of claim 1, wherein lateral sides of the single cores are fixed in one body to the insulating member centering around the insulating member.

3. The reciprocating motor of claim 1, wherein shapes and structures of the single cores are identical to each other.

4. A reciprocating motor comprising:

a multi type outer core having a plurality of single cores constructed with consecutively-stacked lamination sheets centering around a plurality of ring-shaped winding coils so as form a cylindrical structure and an insulating member placed between a plurality of the single cores;

in inner core inserted in the multi type outer core so as to leave a predetermined gap with an inside circumferential face of the multi type outer core; and a moving part having a plurality of magnet rows confronting the winding coils of the multi type outer core respectively so as to reciprocate in accordance with a variation of currents flowing through the winding coils, wherein the single cores of the multi type outer core are constructed with the lamination sheets of 'L' type thin plates stacked each other alternately centering around the winding coils so as to form the cylindrical structure.

5. The reciprocating motor of claim 4, wherein each of the lamination sheets is constructed with a horizontal path part forming an outer circumferential face of the single core, a vertical path part extending from one end of the horizontal path part in a direction vertical to the horizontal path part, and a slant path part inclined from an end of the vertical path part in a length direction of the horizontal path part.

6. The reciprocating motor of claim 5, wherein the respective lamination sheets are stacked alternately so that the vertical and slant path parts confront each other so as to construct the single cores and wherein opening parts are formed between the slant path parts respectively so as to open in a direction of the magnets.

7. The reciprocating motor of claim 6, wherein a length of each of the magnets is determined by a length attained by adding a width of the opening part to a width of the slant path part forming a pole.

8. The reciprocating motor of claim 1, wherein the insulating member is formed to have a predetermined thickness enough to completely isolate the first and second single cores from each other and having a ring shape corresponding to contact faces of the first and second cores.

9. A reciprocating motor comprising:

a multi type outer core having a plurality of single cores constructed with consecutively-stacked lamination sheets centering ground a plurality of ring-shaped winding coils so as form a cylindrical structure and an insulating member placed between a plurality of the single cores;

an inner core inserted in the multi type outer core so as to leave a predetermined grip with an inside circumferential face of the multi type outer core; and a moving part having plurality of magnet rows confronting the winding coils of the multi type outer core respectively so as to reciprocate in accordance with a variation of currents flowing through the winding coils, wherein the first and second single cores are fixed in one body to the insulating member by a connecting-fixing means centering around the insulating member.

10. The reciprocating motor of claim 9, wherein the connecting-fixing means comprises connecting recesses formed at both sides of the single cores and fixing protrusions protruding from both sides of the insulating member so as to fix the first and second single cores thereto by being inserted into the connecting recesses by force.

11. The reciprocating motor of claim 10, wherein the connecting recesses and the fixing protrusions are round ring-shaped so as to be coupled with each other.

* * * * *